US012641353B2

(12) United States Patent
Chae et al.

(10) Patent No.: US 12,641,353 B2
(45) Date of Patent: May 26, 2026

(54) IMAGE SENSOR USING SPAD ARRAY

(71) Applicant: XO Semiconductor Inc., Chuncheon-si (KR)

(72) Inventors: Youngcheol Chae, Seoul (KR); Byungchoul Park, Seoul (KR)

(73) Assignee: XO Semiconductor Inc., Chuncheon-si (KR)

( * ) Notice: Subject to any disclaimer, the term of this patent is extended or adjusted under 35 U.S.C. 154(b) by 80 days.

(21) Appl. No.: 18/847,373

(22) PCT Filed: Oct. 25, 2022

(86) PCT No.: PCT/KR2022/016320
§ 371 (c)(1),
(2) Date: Sep. 16, 2024

(87) PCT Pub. No.: WO2023/140471
PCT Pub. Date: Jul. 27, 2023

(65) Prior Publication Data
US 2025/0175719 A1     May 29, 2025

(30) Foreign Application Priority Data

Jan. 19, 2022    (KR) ........................ 10-2022-0007607

(51) Int. Cl.
*H04N 25/77*          (2023.01)
*H04N 25/79*          (2023.01)
(52) U.S. Cl.
CPC ............. *H04N 25/77* (2023.01); *H04N 25/79* (2023.01)
(58) Field of Classification Search
CPC ........ H04N 25/77; H04N 25/79; H04N 25/53; H04N 25/773; H04N 25/75; G01S 7/4863; G01S 17/894; H10F 77/00; H10F 77/959

(Continued)

(56) References Cited

U.S. PATENT DOCUMENTS 5,841,126  A  *  11/1998  Fossum .................. H04N 25/78
                                               348/E3.018
7,916,180  B2 *   3/2011  Olsen ................... H04N 5/2624
                                               348/218.1

(Continued)

FOREIGN PATENT DOCUMENTS

JP        2019-140537  A     8/2019
JP        2019-165324  A     9/2019

(Continued)

OTHER PUBLICATIONS

Sam W. Hutchings et al., "A Reconfigurable 3-D-Stacked SPAD Imager With In-Pixel Histogramming for Flash LIDAR or High-Speed Time-of-Flight Imaging", Nov. 2019.

(Continued)

*Primary Examiner* — Usman A Khan

(74) *Attorney, Agent, or Firm* — ZION IP; Byungwoong Park

(57)                    ABSTRACT

An image sensor of the present invention comprises: a SPAD array including one or more SPAD pixels; a MUX configured to receive a signal output from the SPAD array; a controller configured to transmit a mode setting signal to the MUX; and a first counter and a second counter configured to output digital signals on the basis of a signal output from the SPAD array, wherein the MUX may change a connection relationship between the first counter and the second counter according to the mode setting signal.

7 Claims, 7 Drawing Sheets

(58) Field of Classification Search
USPC ......................................................... 348/302
See application file for complete search history.

(56)                    References Cited

U.S. PATENT DOCUMENTS

| | | | | |
|---|---|---|---|---|
| 2012/0133955 A1* | 5/2012 | Baxter | ............... | H03K 17/9636 |
| | | | | 356/614 |
| 2013/0334434 A1* | 12/2013 | Nyman | ..................... | G01J 1/44 |
| | | | | 250/371 |
| 2016/0268331 A1 | 9/2016 | Parmesan | | |
| 2019/0326450 A1 | 10/2019 | Iwata | | |
| 2020/0045251 A1* | 2/2020 | Koizumi | ............... | H10F 39/182 |
| 2020/0092540 A1 | 3/2020 | Tsai | | |
| 2021/0270939 A1 | 9/2021 | Sakurano et al. | | |

FOREIGN PATENT DOCUMENTS

| | | | |
|---|---|---|---|
| JP | 2020-022136 A | 2/2020 | |
| JP | 2021-022875 A | 2/2021 | |
| KR | 10-2018-0027527 A | 3/2018 | |
| KR | 10-2020-0011351 A | 2/2020 | |

OTHER PUBLICATIONS

The extended European search report for PCT/KR2022016320, issued on Sep. 8, 2025.
Byungchul Park et al., "A 64×64 SPAD-Based Indirect Time-of-Flight Image Sensor With 2-Tap Analog Pulse Counters", IEEE Journal of Solid-State Circuits, Jul. 2021, pp. 2956-2967.
International Search Report for PCT/KR2022/016320, dated Feb. 27, 2023.

* cited by examiner

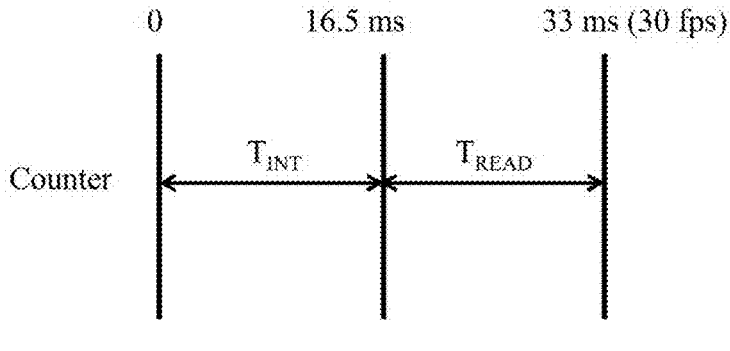
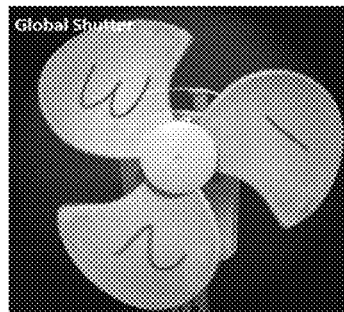
FIG. 2A
Prior Art
FIG. 2B
Prior Art

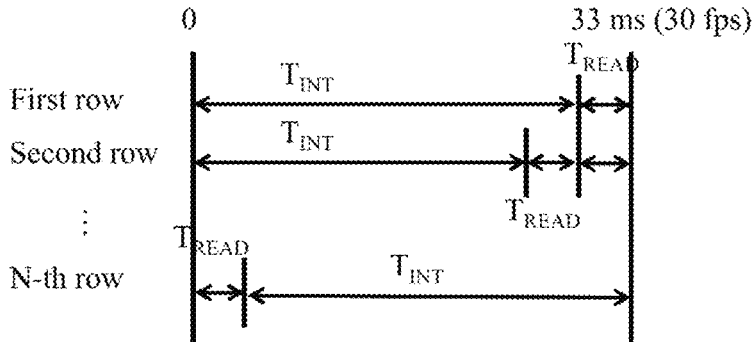
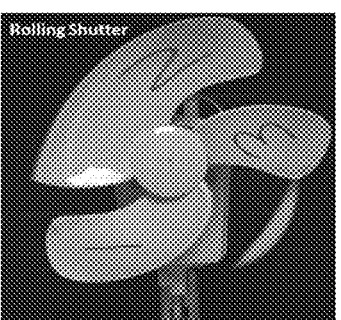
FIG. 3A
Prior Art
FIG. 3B
Prior Art

IMAGE SENSOR USING SPAD ARRAY

TECHNICAL FIELD

The present invention relates to an image sensor using a SPAD array, and more specifically, to an image sensor capable of mode switching to improve image quality.

BACKGROUND ART

An image sensor is a device that implements an image through light, and may include various elements capable of detecting light. Among the elements capable of detecting light, a SPAD pixel is a device capable of detecting a single photon through the avalanche phenomenon, and research on an image sensor using SPAD pixels has been actively conducted recently.

The image sensor detects light in various ways according to modes. Each mode has both advantages and disadvantages, and it is necessary to select each mode depending on a target object being detected. In addition, an image sensor with a new structure capable of solving the problems of each mode is required.

The present invention was developed as part of development of a 20×20 cm large-area hybrid X-ray video detector based on Global Shutter by the Ministry of Science and ICT, Ministry of Trade, Industry and Energy, Ministry of Health and Welfare, and Korea Food and Drug Administration energy (Project identification number: 1711138026; Project number: KMDF_PR_20200901_0048-03; Project name: Pan-ministerial Full-cycle Medical Device Research and Development Project (R&D); Project management agency: Pan-ministerial Medical Device Research and Development Project Group; Project executing agency: Yonsei University; Research period: 2021 Mar. 1~2022 Feb. 28.)

Meanwhile, the Korean government, which is the subject of the project, has no property interest in any aspect of the present invention.

SUMMARY

Technical Problem

One object of the present invention is to provide an image sensor for compensating for the disadvantages of modes by using two or more counters.

Advantageous Effects of the Invention

According to an embodiment of the present invention, an image sensor using two or more counters to compensate for the disadvantages of modes may be provided.

BRIEF DESCRIPTION OF THE DRAWINGS

FIGS. 2A and 2B are drawings showing counter operation and implemented images in the global shutter mode of the conventional image sensor.

FIGS. 3A and 3B are drawings showing a counter operation and an implemented image in the rolling shutter mode of a conventional image sensor.

DETAILED DESCRIPTIONS OF EXEMPLARY EMBODIMENTS

Figure 1:
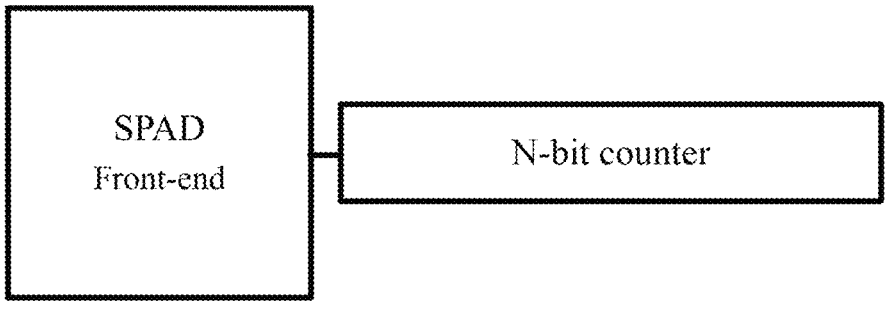
FIG. 1 is a drawing showing a configuration of a conventional image sensor using single photon avalanche diodes (SPADs).

According to an embodiment, an image sensor includes a single photon avalanche diode (SPAD) array including one or more SPAD pixels, a multiplexer (MUX) which receives a signal output from the SPAD array, and a controller which transmits a mode setting signal to the MUX, and a first counter and a second counter, each of which outputs a digital signal based on the signal output from the SPAD array, and the MUX may change a connection relationship of the first counter and the second counter according to the mode setting signal.

The mode setting signal may include a first signal corresponding to a first mode in which a photon integration period of the first counter and a photon integration period of the second counter do not overlap, and a second signal corresponding to a second mode in which an operation of the first counter is performed after an operation of the first counter.

The first mode may be a mode in which one of the first counter and the second counter is in a photon integration period and the other is in a read-out period, and the second mode may be a mode in which a photon integration period corresponding to a first SPAD pixel included in the SPAD array of the first counter and a photon integration period corresponding to a second SPAD pixel included in the SPAD array overlap with each other.

The MUX may transmit the signal output from the SPAD array to the first counter and to the second counter, when the MUX obtains the first signal from the controller, and transmit the signal output from the SPAD array directly to the first counter only when the MUX obtains the second signal from the controller.

When the MUX obtains the first signal, the first counter and the second counter may be connected in parallel, and the second counter may obtain, from the MUX, the signal output from the SPAD array.

When the MUX obtains the second signal, the first counter and the second counter may be connected in series, and the second counter may obtain, from the first counter, the signal output from the SPAD array.

The first SPAD pixel and the second SPAD pixel may be placed in different rows on the SPAD array.

The SPAD array may be arranged on a second wafer different from a first wafer on which the first counter and the second counter are arranged.

The controller may generate an image of a target object that reflects light toward the SPAD array based on a first result signal output from the first counter and a second result signal output from the second counter.

The controller may change the mode setting signal based on a first image of the target object at a first time period and a second image of the target object at a second time period.

MODE FOR INVENTION

Since embodiments disclosed in the present specification are intended to clearly describe the spirit of the present invention to those or ordinary skill in the art to which the present invention pertains, the present invention is not limited to the embodiments described in the present specification, and it should be understood that the scope of the present invention includes changes or modifications without departing from the spirit of the present invention.

For the terminology used in the present specification, general terms are selected which are widely used at present while taking the functions in the present invention into consideration, but it may vary according to the intention of those of ordinary skill in the art to which the present invention pertains, general practices, or the advent of a new technology. It should be noted that, when a particular term is defined as a certain meaning and used, the meaning of the term will be separately described. Consequently, the terms used herein should be construed on the basis of substantial meanings of the terms and content throughout the present specification instead of simply on the basis of names of the terms.

The accompanying drawings herein are for easily describing the present invention. Since shapes illustrated in the drawings may have been exaggeratedly depicted as much as necessary to assist in understating the present invention, the present invention is not to be limited by the drawings.

When detailed description of a known configuration or function related to the present invention is deemed to obscure the gist of the present invention in the present specification, the detailed description related thereto will be omitted as necessary.

FIG. 1 is a drawing showing a configuration of a conventional image sensor using single photon avalanche diodes (SPADs).

Referring to FIG. 1, a conventional image sensor using SPADs may include a SPAD array including one or more SPADs and a counter that receives a result signal of the SPAD array and counts photons.

The conventional image sensor is fixed to one of a global shutter mode and a rolling shutter mode, and uses a single counter, which may cause various problems. Referring to FIG. 2 and FIG. 3 below, the problems of the conventional image sensor will be described.

FIG. 2 is a drawing showing counter operation and implemented images in the global shutter mode of the conventional image sensor.

Referring to FIG. 2, because the conventional image sensor uses a single counter, a problem has occurred in which the counter is unable to integrate photons when the counter is read out in the global shutter mode.

Specifically, referring to FIG. 2A, a photon integration period (T_INT) for integrating photons and a read-out period (T_READ) for reading integrated photons are alternately repeated in the counter.

For example, in FIG. 2A, in the case of 30 fps, a period of from 0 s to 16.5 ms may be the photon integration period (T_INT), and a period of from 16.5 ms to 33 ms may be the read-out period (33 ms) after the photon integration period (T_INT). After the read-out period of from 16.5 ms to 33 ms, the photon integration period (T_INT) may begin again from 33 ms to 49.5 ms. In this way, the photon integration period and read-out period of the counter in the global mode may alternately be repeated.

FIG. 2B shows an image generated based on the counting result of the counter in the global shutter mode. FIG. 2B will be described below in comparison with FIG. 3B in the description of FIG. 3.

Since photons are not integrated during the read-out period of the counter, a problem occurred in that a long time is taken for an image sensor to generate one image frame. That is, when the image sensor operates in the global shutter mode, a problem occurred in that a frame rate is low. To solve the above problem of the global shutter mode, the rolling shutter mode has been introduced.

FIG. 3 is a drawing showing a counter operation and an implemented image in the rolling shutter mode of a conventional image sensor.

Referring to FIG. 3, to solve the low frame rate in the global shutter mode, the counter operation in the rolling shutter mode, which performs photon integration and read-out for each row of a SPAD array and a generated image may be seen.

Specifically, referring to FIG. 3A, the counter may perform photon integration and readout on SPAD pixels of each row in the SPAD array.

For example, in the case of 30 fps, for a first row, the counter may allocate a first period, which is a part of a time period of 33 ms, as a photon integration period (T_INT), and a second period, which is the remaining part of the time period of 33 ms excluding the first period, as a read-out period (T_READ). In addition, for a second row, the counter may allocate a third period, which is a part of a time period of 33 ms, as a photon integration period (T_INT), and a second period, which is the remaining part of the time period of 33 ms excluding the third period, as a read-out period (T_READ).

In this case, the read-out periods of rows may be set not to overlap. That is, when the counter performs readout on the first row, the counter may be unable to integrate photons for the first row, but the counter may be able to integrate photons for the second row, thereby partially solving the problem of not being able to integrate photons during the read-out period, which was a problem in the global shutter.

In the rolling shutter mode, because the counter performs photon integration and readout for each row, a time loss may be smaller than in the global shutter mode. However, an image generated by the image sensor in the rolling shutter mode may have a problem that the sensing times for rows are different. That is, motion artifacts and the jello effect may occur. Therefore, when an object for image implementation moves, the problem of image distortion may occur.

Specifically, comparing FIG. 2B and FIG. 3B, the objects are both moving fans. For moving objects, it may be seen that the image sensor operating in the global shutter mode does not cause image distortion when considering the size of fan blades, or the like even when the fan moves. This is because the global shutter mode generates an image based on the results sensed by all SPAD pixels included in the SPAD array at the same time period.

On the other hand, it may be seen that the image sensor operating in the rolling shutter mode causes image distortion when considering the size of the fan, or the like, as in the image of FIG. 3B. This is because the SPAD pixels included in the SPAD array are separated into rows in the rolling shutter mode, and the time periods at which light is sensed are different for the rows.

As described above, because the global shutter mode and the rolling shutter mode each have problems, it may be difficult for an image sensor operating in one fixed mode to implement a high-quality image. In addition, the image sensor using one counter in the global shutter mode may cause a low frame rate. Therefore, the image sensor of the present invention proposes a solution to solve the above problems below.

Figure 4:
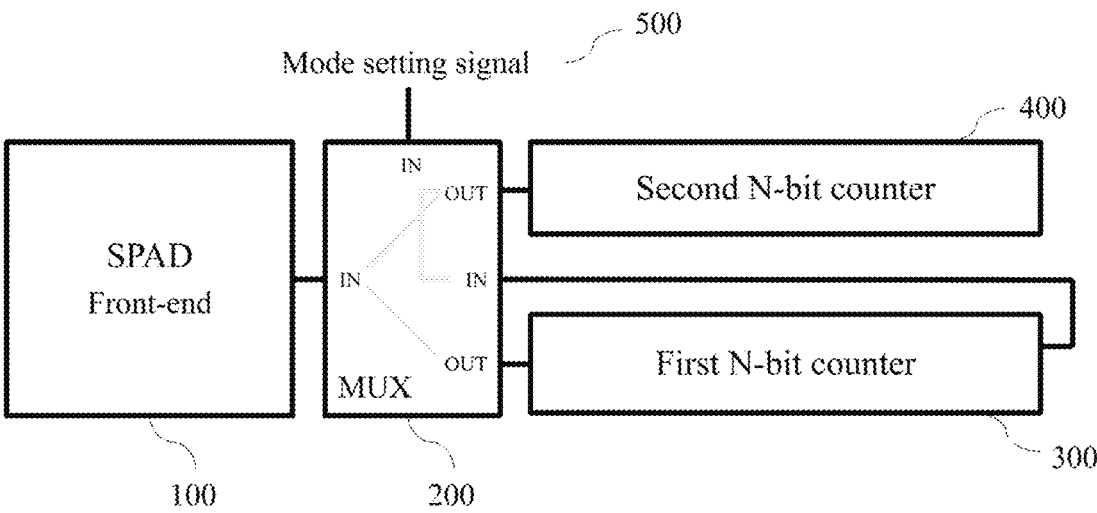
FIG. 4 is a drawing showing the configuration of an image sensor according to an embodiment of the present invention.

FIG. 4 is a drawing showing the configuration of an image sensor according to an embodiment of the present invention.

Referring to FIG. 4, an image sensor according to an embodiment of the present invention may include a SPAD array 100, a MUX (Multiplexer) 200, a first counter 300, and a second counter 400.

The SPAD array 100 may include one or more SPAD pixels. The SPAD array 100 may include a plurality of SPAD pixels arranged in a matrix. For example, the SPAD array 100 may be a SPAD matrix arranged in the form of 8×8, 64×64, 100×100, 1024×1024, 4000×4000, or the like, but is not limited thereto, and may be implemented in various forms such as a circular, elliptical, or honeycomb structure.

The SPAD array 100 may include one or more sub-arrays composed of "N" SPAD pixels. For example, the SPAD array 100 may include multiple sub-arrays each composed of SPAD pixels in the form of a 4×4 matrix.

When light is incident on the SPAD array 100, photons may be detected due to the avalanche phenomenon. The SPAD array 100 may output a result signal according to photon detection. The result signal may be an analog pulse. Accordingly, there is a need for a counter capable of counting photons based on the analogue pulse described above.

The MUX 200 is connected to the SPAD array 100 to receive a signal output from the SPAD array 100. In this case, the signal output from the SPAD array 100 is a result signal according to photon detection, and the result signal may be an analog pulse as described above.

The MUX 200 may receive a mode setting signal 500 by a controller (not shown). The controller may perform overall control for the image sensor. In addition, the controller may be an MCU that generates an image based on the result signal from the SPAD array 100.

The MUX 200 may transmit the signal received from the SPAD array 100 to the counters 300 and 400. In this case, transmitting the signal to the counters 300 and 400 may vary depending on the mode setting signal 500. The mode setting signal will be described below together with the description of the controller.

The MUX 200 may change the connection relationship of the counters 300 and 400 according to the mode setting signal 500. Specifically, the MUX 200 may change the connection relationship of the first counter 300 and the second counter 400 to serial or parallel connection according to the mode setting signal 500. Alternatively, the MUX 200 may change a signal applied to the second counter 400. Alternatively, the MUX 200 may change a subject that inputs a signal to the second counter 400.

For example, when the mode setting signal is a first signal, the MUX 200 may set the connection relationship of the counters such that the first counter 300 and the second counter 400 are connected in parallel with each other. In this case, the second counter 400 may receive a signal output from the SPAD array 100 via the MUX 200. That is, the subject that inputs a signal to the second counter 400 may be the MUX 200.

Specifically, the MUX 200 may set an input IN to a terminal connected to the SPAD array 100 and set an output OUT to two terminals connected to the first counter 300 and the second counter 400 to set the connection relationship such that the first counter 300 and the second counter 400 are connected in parallel.

Also, for example, when the mode setting signal is a second signal, the MUX 200 may set the connection relationship of the counters such that the first counter 300 and the second counter 400 are connected in series. In this case, the second counter 400 may be connected in series with the first counter 300 to obtain a signal output from the SPAD array 100 via the first counter 300. That is, the subject that inputs a signal to the second counter 400 may be the first counter 300.

Specifically, the MUX 200 may set the input IN to the terminal connected to the SPAD array 100 and set the output OUT to the terminal connected to the first counter 300 to directly transmit the signal output from the SPAD array 100 only to the first counter 300. In this case, the output terminal of the first counter 300 may be connected to the input terminal of the second counter 400 to allow the second counter 400 to indirectly obtain the signal output from the SPAD array 100.

The operation of the MUX 200 according to the mode setting signal 500 will be described below with reference to FIGS. 5 to 7.

The first counter 300 and the second counter 400 may count photons based on a signal output from the SPAD array 100 and output a digital signal related thereto. The first counter 300 and the second counter 400 may be N-bit counters capable of counting up to N powers of 2, where N is an integer greater than or equal to 1. When the first counter 300 and the second counter 400 are connected in series, the first counter 300 and the second counter 400 may operate as 2N-bit counters.

In this specification, the image sensor is described as including two counters as an example, but the image sensor is not limited thereto, and the image sensor may include a plurality of counters. In this case, the two counters may operate as a pair. That is, the two counters may be connected in series or in parallel as a pair according to a mode setting signal.

The image sensor may include a controller that outputs the mode setting signal 500. The mode setting signal 500 may include a first signal corresponding to the global shutter mode and a second signal corresponding to the rolling shutter mode.

The global shutter mode may be a mode in which photon integration and readout are performed at the same time for all SPAD pixels included in the SPAD array 100 to generate one frame. That is, the global shutter mode may be a mode in which the photon integration period and read-out period of a counter are alternately and repeatedly performed.

The rolling shutter mode may be a mode in which photon integration and readout are performed on each row for the SPAD pixels included in the SPAD array 100 to generate one frame. That is, the rolling shutter mode may be a mode in which the photon integration period of the SPAD pixels of the first row included in the SPAD array 100 partially overlaps with the photon integration period of the SPAD pixels of the second row.

The controller may generate an image for a target object to be detected based on the output signal of the counter. In this case, the controller may determine and/or set the mode setting signal 500 according to the motion of the target object.

For example, when the target object is dynamic, the controller may set the mode setting signal 500 to the first signal corresponding to the global shutter mode to minimize motion artifacts and the jello effect for dynamic motion.

Also, for example, when the target object is static, the controller may set the mode setting signal 500 to the second signal corresponding to the rolling shutter mode to increase the frame rate and generate an image.

In this way, the controller may determine the motion of the target object and set or change a mode optimized for the target object. There may be various methods by which the controller determines the motion of the target object.

For example, the controller may detect a distance from the target object using light, and when a change in the distance of the target object exceeds a certain level, the controller may determine the motion of the target object to be dynamic. Specifically, the image sensor may include a separate SPAD pixel for distance detection, and may detect a distance from the target object through the separate SPAD pixel. However, the present invention is not limited thereto, and one or more of the SPAD pixels included in the SPAD array 100 may be used for distance detection of the target object without arranging a separate SPAD pixel.

In addition, for example, the controller may determine the motion of the target object based on a difference in pixel values between a first image generated at a first time period and a second image generated at a second time period. Specifically, the controller may compare a pixel value at a first position, which is included in the first image generated at the first time period, with a pixel value at the first position, which is included in the second image generated at the second time period and, when a change in pixel value exceeds a certain level, determine that the motion of the target object is dynamic.

The image sensor may be implemented through one or more wafers. This may vary depending on the arrangement relationship of the SPAD array 100 and the counters 300 and 400.

According to an embodiment, the SPAD array 100 and the counters 300 and 400 may be arranged on one wafer. In this case, two counters may be connected for each of SPAD pixels included in the SPAD array 100. However, the present invention is not limited thereto, and two counters may be connected for each of sub-arrays included in the SPAD array 100.

According to another embodiment, the SPAD array 100 and the counters 300 and 400 may be arranged on different wafers, respectively. In this case, a first wafer on which the SPAD array 100 is arranged may be located above a second wafer on which the counters 300 are 400 are arranged.

The reason why the SPAD array 100 and the counters 300 and 400 are arranged on different wafers may be to secure a light-receiving area of the SPAD pixels. That is, when the counters 300 and 400 are arranged between the SPAD pixels included in the SPAD array 100, the light incident on the area where the counters are placed may not be detected, resulting in light loss. Therefore, the area where the SPAD array 100 is able to detect light and the area where the counter is able to perform a circuit operation may be separated using different wafers.

Figure 5:
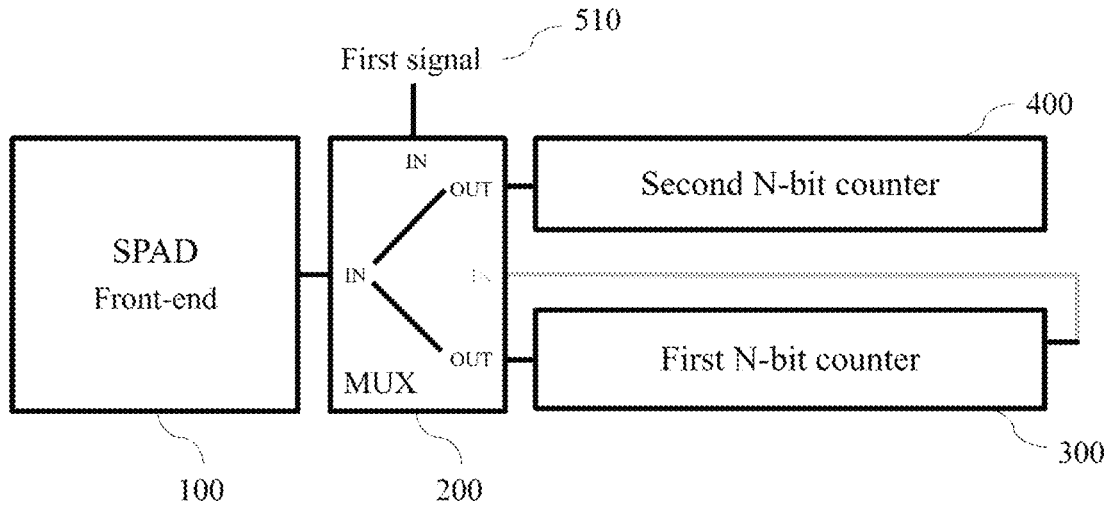
FIG. 5 is a diagram showing a configuration of an image sensor in a first mode according to an embodiment of the present invention.

FIG. 5 is a diagram showing a configuration of an image sensor in a first mode according to an embodiment of the present invention.

Referring to FIG. 5, the controller may set the mode setting signal 500 to a first signal 510 to set the image sensor to the first mode. In this case, the first mode may be a mode corresponding to the global shutter mode.

The MUX 200 may receive the first signal 510 from the controller. The MUX 200 may change the connection relationship between the first counter 300 and the second counter 400 based on the first signal 510. The MUX 200 may connect the first counter 300 and the second counter 400 in parallel to directly transmit the signal output from the SPAD array 100 to the first counter 300 and the second counter 400.

In the first mode, the first counter 300 and the second counter 400 may alternately perform the photon-integration and readout operations in response to the output signal of the SPAD array 100. Since two counters are used, the problem of the global shutter mode in which photon integration is not performed during the read-out period may be solved.

The operation method of the first counter 300 and the second counter 400 will be described with reference to FIG. 6.

Figure 6:
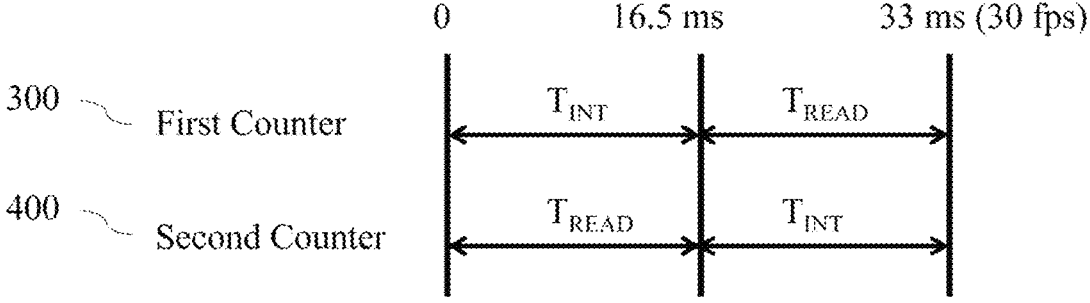
FIG. 6 is a drawing for describing operation of a counter in a first mode.

FIG. 6 is a drawing for describing operation of a counter in a first mode.

Referring to FIG. 6, the first counter 300 and the second counter 400 may perform photon integration and read-out alternately. That is, while the first counter 300 integrates photons, the second counter 400 may perform read-out, and while the first counter 300 performs read-out, the second counter 400 may integrate photons. Therefore, the photon integration period of the first counter 300 and the photon integration period of the second counter 400 may not overlap each other.

For example, as shown in FIG. 6, when a frame rate is 30 fps, the first counter 300 may integrate photons during a first period of from 0 seconds to 16.5 ms as the first period is set as the photon integration period T_INT, and the second counter 400 may read out the result of the photon integration performed before the first period during the first period as the first period is set as the read-out period T_READ.

In addition, the first counter 300 may read out the result of the photon integration performed during a second period of from 16.5 ms to 33 ms, as the second period is set as the read-out period T_READ, and the second counter 400 may integrate photons during the second period as the second period is set as the photon integration period T_INT.

Since the image sensor of the present invention uses two counters, the read-out of the counters may be performed alternately in the first mode corresponding to the global shutter mode, thereby solving the conventional problem of the low frame rate. That is, the time for generating an image may be shortened compared to when one counter is used.

Figure 7:
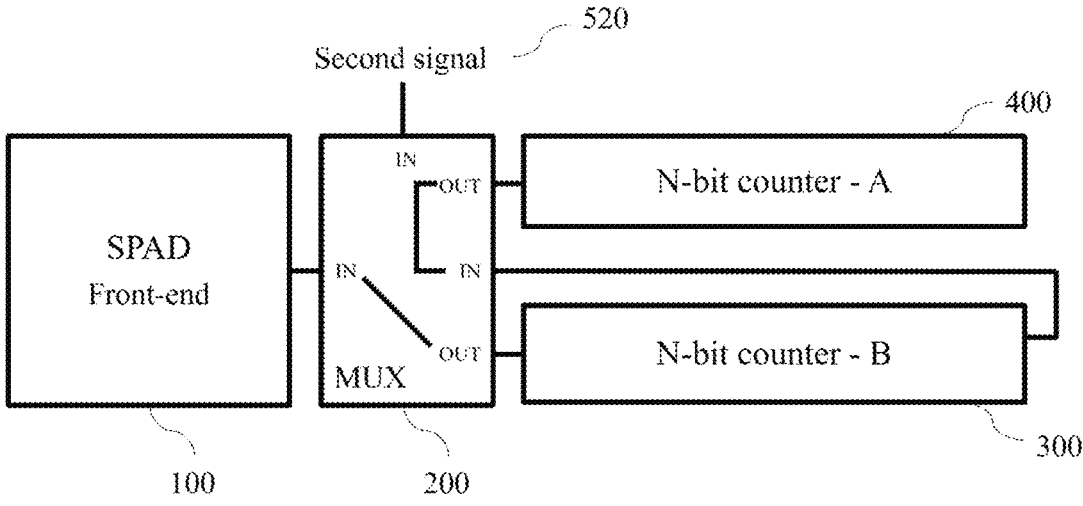
FIG. 7 is a diagram showing a configuration of an image sensor in a second mode according to an embodiment of the present invention.

FIG. 7 is a diagram showing a configuration of an image sensor in a second mode according to an embodiment of the present invention.

Referring to FIG. 7, the controller may set the mode setting signal 500 to a second signal 520 to set the image sensor to a second mode. In this case, the second mode may be a mode corresponding to the rolling shutter mode.

The MUX 200 may receive the second signal 520 from the controller. Based on the second signal 520, the MUX 200 may change the connection relationship of the first counter 300 and the second counter 400. The MUX 200 may connect the first counter 300 and the second counter 400 in series to directly transmit a signal output from the SPAD array 100 to the first counter 300 and indirectly to the second counter 400 via the first counter 300.

Since the second counter 400 receives an input signal from the first counter 300, the counting operation of the second counter 400 may be performed after the counting operation of the first counter 300 is performed. That is, the operation of the first counter 300 and the operation of the second counter 400 are not performed simultaneously, and the operation of the second counter 400 may be performed after the operation of the first counter 300.

In the second mode, the first counter 300 and the second counter 400 may be connected in series to operate as 2N-bit counters. The two counters are able to perform counting of 2N powers of 2, thus increasing the dynamic range of the image sensor. Thus, the image sensor may maintain a high frame rate in the rolling shutter mode and minimize motion artifacts to improve image quality.

The first counter 300 and the second counter 400 may perform photon integration and readout for each row, as shown in FIG. 3.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present invention, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other embodiments, and equivalents to the claims are within the scope of the following claims.

The invention claimed is:

1. An image sensor comprising:
   a single photon avalanche diode (SPAD) array including one or more SPAD pixels;
   a multiplexer (MUX) configured to receive a signal output from the one or more SPAD array;
   a controller configured to transmit a mode setting signal to the MUX; and
   one or more counters, each counter configured to output a digital signal based on the signal output from the one or more SPAD array,
   wherein
   the MUX is configured to change a connection relationship of the one or more counters according to the mode setting signal,
   the one or more counters comprises a first counter and a second counter, the mode setting signal includes:
   a first signal corresponding to a first mode in which a photon integration period of the first counter and a photon integration period of the second counter do not overlap; and
   a second signal corresponding to a second mode in which an operation of the second counter is performed after an operation of the first counter,
   when the mode setting signal is the first signal, the MUX:
   transmits the signal output from the SPAD array, parallelly, to the first counter and to the second counter; and
   sets the connection relationship of the first counter and the second counter such that the first counter and the second counter are connected in parallel with each other, and
   when the mode setting signal is the second signal, the MUX:
   transmits the signal output from the SPAD array only to the first counter;
   controls the second counter to obtain the signal output from the first counter; and
   sets the connection relationship of the first counter and the second counter such that the first counter and the second counter are connected in series.

2. The image sensor of claim 1, wherein the first mode is a mode in which one of the first counter and the second counter is in a photon integration period and the other one of the first counter and the second counter is in a read-out period, and
   wherein the second mode is a mode in which a photon integration period of the first counter corresponding to a first SPAD pixel included in the SPAD array and a photon integration period of the first counter corresponding to a second SPAD pixel included in the SPAD array overlap with each other.

3. The image sensor of claim 2, wherein the first SPAD pixel and the second SPAD pixel are placed in different position on the SPAD array.

4. The image sensor of claim 1, wherein the SPAD array and the one or more counters are integrated on one wafer.

5. The image sensor of claim 1, wherein the SPAD array and the one or more counters are integrated on different wafers, respectively, and the SPAD array is integrated on a second wafer different from a first wafer on which the one or more counters are integrated.

6. The image sensor of claim 1, wherein the controller is configured to generate a mode setting signal that is based on a first result signal output from one of the one or more counters.

7. The image sensor of claim 6, wherein the controller is configured to change the mode setting signal based on a first image at a first time period and a second image at a second time period.

* * * * *